United States Patent
Studdiford et al.

[19]

[11] Patent Number: 5,833,188
[45] Date of Patent: Nov. 10, 1998

[54] ACCESSORY MOUNTING APPARATUS

[75] Inventors: Robert Douglas Studdiford, Berkeley; Michael B. Dunn, Oakland, both of Calif.

[73] Assignee: Twofish Unlimited, Berkeley, Calif.

[21] Appl. No.: 359,530

[22] Filed: Dec. 20, 1994

[51] Int. Cl.⁶ .................................................. A47B 96/06
[52] U.S. Cl. .................................. 248/229.17; 248/230.8
[58] Field of Search ............................... 248/205.2, 313, 248/311.2, 229.17, 230.8, 230.1, 541; 224/901, 912, 924, 926; 24/16 R, 442, 306

[56] References Cited

U.S. PATENT DOCUMENTS

| | | | |
|---|---|---|---|
| D. 344,967 | 3/1994 | Webster | 248/205.2 |
| 1,413,530 | 4/1922 | Harned . | |
| 2,462,442 | 2/1949 | Wallace | 248/42 |
| 3,632,069 | 1/1972 | Thayer et al. | 248/56 |
| 3,632,071 | 1/1972 | Cameron et al. | 248/749 B |
| 3,947,927 | 4/1976 | Rosenthal | 24/815 K |
| 4,170,337 | 10/1979 | Davis | 248/475 R |
| 4,176,770 | 12/1979 | Griggs | 224/30 A |
| 4,193,525 | 3/1980 | Sommens | 224/926 |
| 4,310,110 | 1/1982 | Dexter | 224/246 |
| 4,437,596 | 3/1984 | Shook | 224/39 |
| 4,440,519 | 4/1984 | Pennel et al. | 403/391 |
| 4,697,725 | 10/1987 | Miree | 224/41 |
| 4,809,890 | 3/1989 | Tsigadas | 224/32 R |
| 4,909,051 | 3/1990 | Lee | 248/74.3 |
| 4,963,410 | 10/1990 | Bryant | 24/306 |
| 4,998,652 | 3/1991 | Champagne | 224/39 |
| 5,011,055 | 4/1991 | Neugent | 224/39 |
| 5,020,706 | 6/1991 | Birch | 224/39 |
| 5,035,383 | 7/1991 | Rainville | 248/68.1 |
| 5,076,526 | 12/1991 | Zane et al. | 248/314 |
| 5,138,901 | 8/1992 | Dabandjian et al. | 74/551.8 |
| 5,142,743 | 9/1992 | Hahn | 24/16 R |
| 5,167,353 | 12/1992 | Hughes | 224/39 |
| 5,226,341 | 7/1993 | Shores | 74/551.8 |
| 5,326,055 | 7/1994 | Page et al. | 248/74.3 |
| 5,395,018 | 3/1995 | Studdiford | 224/41 |
| 5,598,998 | 2/1997 | Meuth | 403/391 |

FOREIGN PATENT DOCUMENTS

| | | |
|---|---|---|
| 1.343.400 | 2/1964 | France . |
| 188576 | 8/1992 | Taiwan . |
| 191491 | 9/1992 | Taiwan . |
| 210710 | 8/1993 | Taiwan . |
| 2063354 | 6/1981 | United Kingdom . |

*Primary Examiner*—Leslie A. Braun
*Assistant Examiner*—Gwendolyn Baxter
*Attorney, Agent, or Firm*—Coudert Brothers

[57] ABSTRACT

The present invention relates to mounting apparatus for releasably securing a bicycle accessory to a bicycle, which includes a fabric strap having a fabric strap first hook portion, a fabric strap first strap portion, a fabric strap second hook portion, a fabric strap first loop portion, a fabric strap second loop portion, a fabric strap second strap portion, a fabric strap buckle engagement portion, and a fabric strap buckle; and a mounting base defining a slot receiving the fabric strap therethrough and having a mounting base first curved portion, a mounting base second curved surface, a mounting base left slot opening and a mounting base right slot opening.

20 Claims, 2 Drawing Sheets

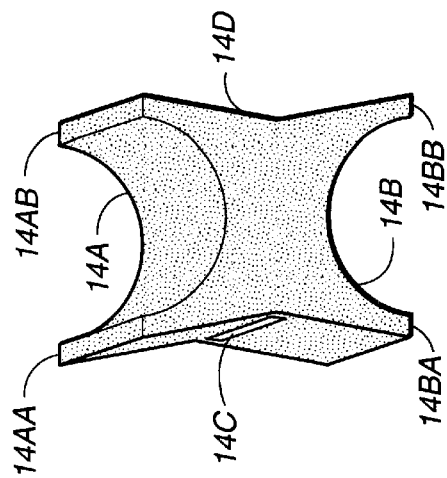
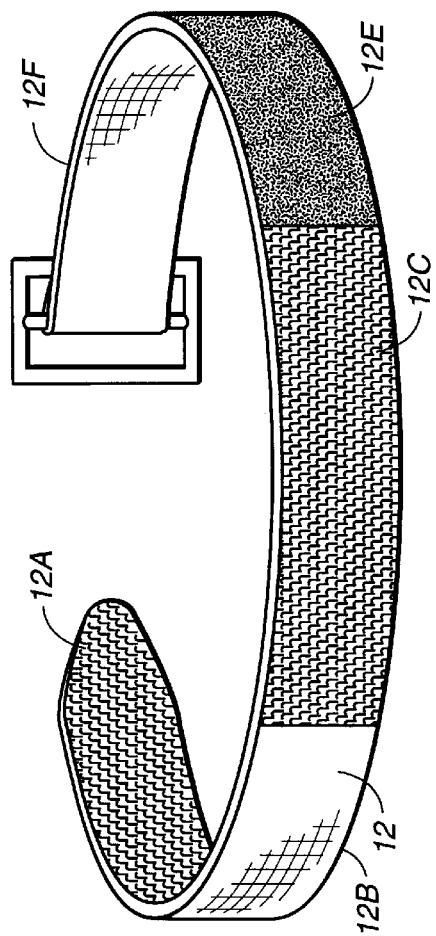
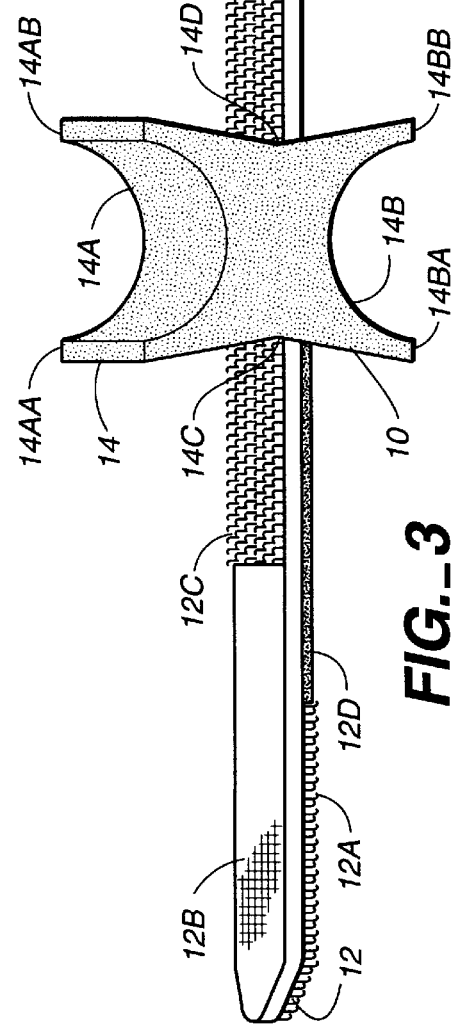

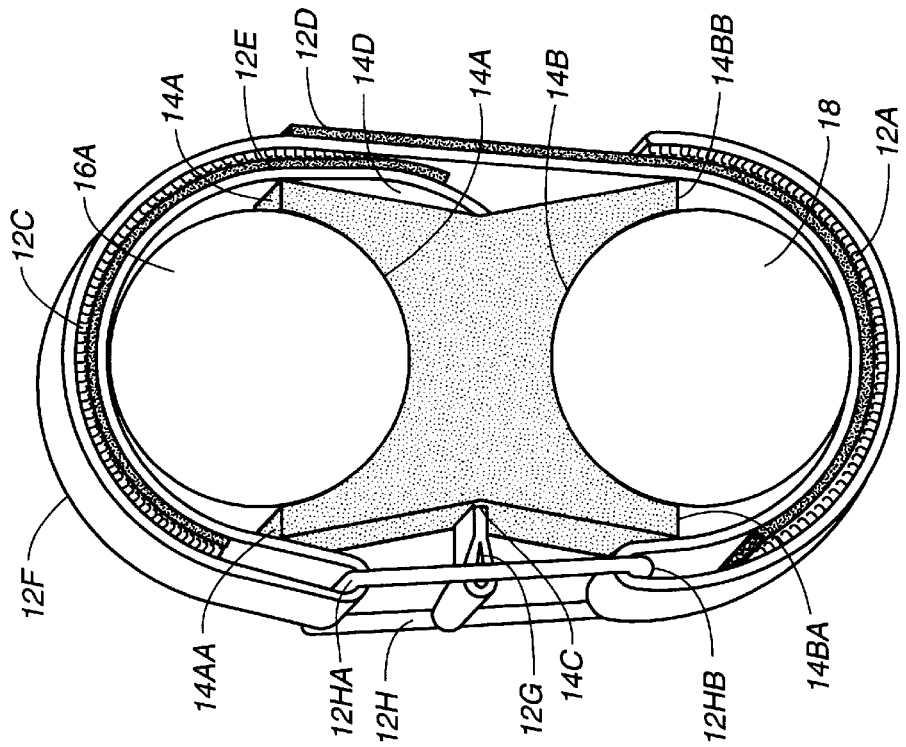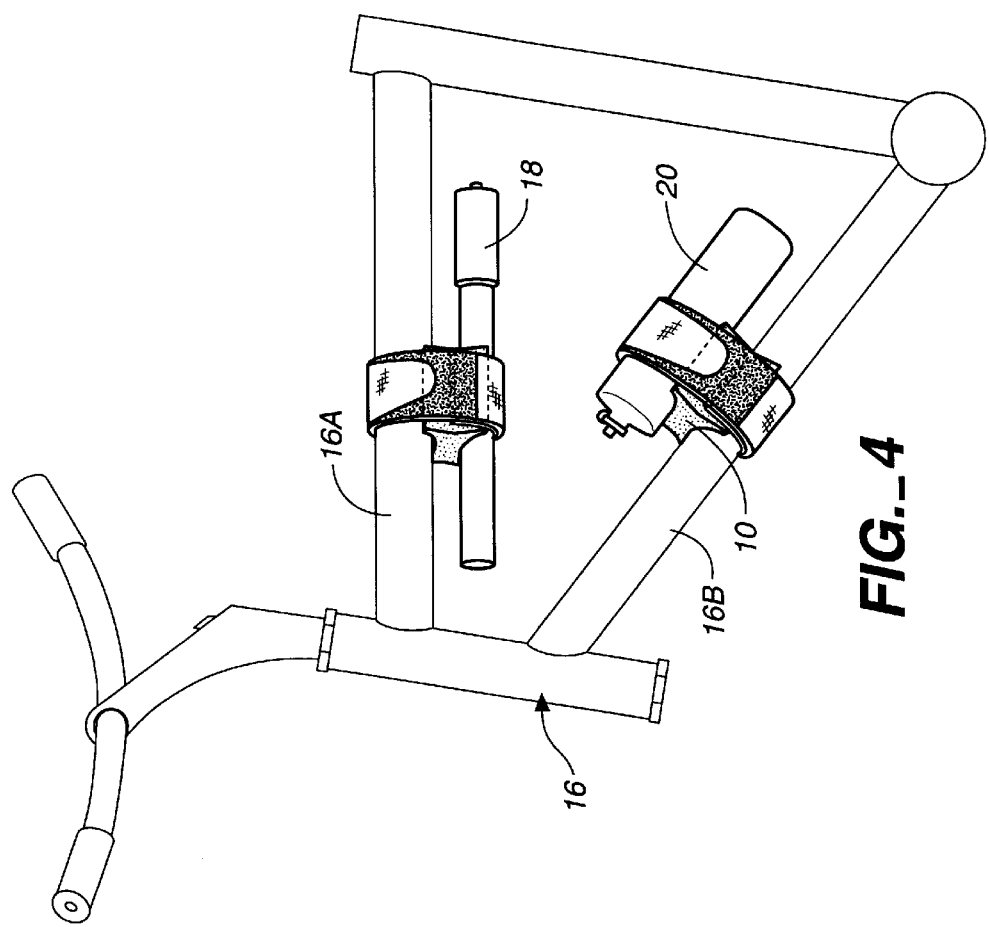

ACCESSORY MOUNTING APPARATUS

FIELD OF THE INVENTION

The present invention relates generally to apparatus and methods for mounting accessories and, more particularly, to apparatus and methods for releasably securing bicycle accessories, such as locks and water bottles, to a bicycle.

BACKGROUND OF THE INVENTION

Various bicycle accessories, including tire pumps and water bottles, are desirably carried with the rider and affixed to the bicycle frame. Generally such items as a bicycle pump are connected to the frame by means of a holder mechanism that is bolted to the frame and has portions that can extend completely around the cylindrical pump body. Frequently some type of fastener, such as a bolt or other threaded member, is employed to attach the holder to the bicycle frame, and a manually operable fastener is employed to attach the pump body to the holder itself.

Particularly for a type of bicycle, including that known as a mountain bike, that is designed for use over rough terrain, vibration to which the pump holder and pump is subjected make common clip type holders unreliable. This is because vibration experienced in rough terrain may shake the pump and dislodge it from the holder, unless separate locking fasteners are used to securely fix the pump to the holder. The use of such fasteners is undesirable, apart from the high cost, in that additional time and effort is required in attaching and detaching the pump from the holder because of the need to manipulate the fasteners. Unless securely attached, such fasteners may be easily misplaced or lost. Presently known holder arrangements that do not employ fasteners for securing the pump to the holder do not provide a sufficiently firm attachment of the pump to the holder to ensure against accidentally dislodging the pump.

Modern bicycle riding has incorporated an original equipment manufactured accessory called a brazed on water bottle holder boss. This accessory has become an industry standard for firmly securing a water bottle holder to the tubing of a conventional bicycle.

This boss fixture is located on the tubing of a bicycle frame usually midway on the down tube and seat tube. The boss is a metal fixture permanently affixed to the tubing by brazing or bonding. One boss fixture houses a threaded five millimeter slot which accepts a five millimeter bolt. A pair of these boss fixtures is spaced laterally from one another on the bicycle tubing so as to align with the two slots of a conventional water bottle holder. Some less expensive, mass produced bicycle tubing is drilled and threaded directly to the tubing without brazing.

When the consumer buys the bicycle with these brazed on bosses they become the method which holds water bottle holders. Water bottle holders are made of metals and plastics which are slotted to align with the brazed on boss fixtures of a bicycle.

The water bottle holders are attached with five millimeter hex bolts which in turn bolt into the bicycle boss fixtures. A recent trend in the industry has been to use a pair of brazed on water bottle boss fixtures to hold tire inflation accessories such as a frame air pump which is used to inflate tires.

The addition of brazed on water bottle bosses has enhanced the sport of bicycling. Factory installed water bottle brazed on boss fixtures are now found on most currently made quality bicycles.

All Terrain Bicycles usually have two pairs of factory installed brazed on water bottle boss fixtures. One pair of brazed bosses is on the down tube and another pair of bosses brazed to the seat tube. Industry evolution and consumer demand have increased the need for more sets of these brazed on water bottle holder bosses. The trend is for more brazed on bosses located along the down and seat tubes. Some companies are now locating these boss fixtures onto the stems of certain bicycles.

Factory installed brazed on water bottle holder boss fixtures are useful but present certain problems with respect to frame integrity. A hole must be drilled through the already thin tubing of the bicycle. Heat is then applied using a torch to permanently braze the boss fixtures to the frame. This heat causes metallurgical changes which weakens the tubing.

Bicycle owners who have bicycles constructed without factory installed boss fixtures must resort to the use of various after market clamping devices. These clamping devices are usually of some banded strap assembly made of metal or plastic. None of these assemblies offer the cyclist much versatility. They are usually of low quality and cheaply made. These clamps range from radiator hose varieties to plastic semi circles around the tubing held by a wingnut. Most plastic models do not allow for difference in tubing sizes other than the use of shim material which is usually not included. Metal models tend to mar the finish of the bicycle and can even damage the frame tubing itself.

U.S. Pat. No. 5,076,526 to Zane discloses an improved fastener for releasably securing bicycle accessories to a bicycle frame is disclosed. The fastener is formed with an integral body of a hard resilient polymer including a pair of opposed retainer portions and a medial portion therebetween. One retainer portion has an opening defined by a flexible pair of jaws with inner surfaces presenting a curved seat for snugly receiving a part of a bicycle frame ranging in diameter from one to about 1½ inches. The medial portion acts as a buffer for mechanically and flexibly isolating the pair of retainer portions from each other and features a cusped opening. The other retainer portion is formed with a cross sectional opening including circular, rectangular, oval, crescent-shaped, pentagonal, hexagonal and octagonal. The pair of jaws are secured to the bicycle part by either a bent bolt, a straight bolt or a sex bolt.

U.S. Pat. No. 5,020,706 to Birch discloses a spoke holder comprising a pair of identical structural members which attach to the frame of a bicycle in a variety of locations. The spoke holder, in addition to bicycle frame attachment means, has multiple channels passing therethrough, each channel being capable of securely and removably holding a single spoke. Two different embodiments of the spoke holder are described which may be securely attached to the bicycle frame by the adjustment of either a screw or a plastic tie.

U.S. Pat. No. 5,011,055 to Neugent discloses a bracket for securely attaching a bicycle pump to a tubular frame member of a bicycle comprises a base having a surface curved to fit partly around a tubular frame member and a plurality of ties extending through holes in the base for securing the base to the bicycle frame member. Hooks formed of resilient, U-shaped circularly bent strips are fixed to and extend laterally in opposite directions from sides of the base so that a bicycle pump may be placed between the hooks and twisted to snap the pump body into both of the resilient hooks, which then securely press the pump body against the bracket base and resiliently hold the pump in place.

U.S. Pat. No. 4,998,652 to Champagne discloses a clamp-on water bottle holder for bicycles will be made of various metals and plastics to retro-fit those bicycles which don't have factory installed braze-on bosses. They will come in many model types and will also fit current bicycles which do have factory installed braze-ons. All clamp-on models will fit either type of bicycle. The variety of clamping devices will be determined by the composition of the particular clamp-on model and economics. The clamp-on bosses will be modular and adjustable to different bicycle frame tubing sizes. Some models of clamp-on bosses will hold more than one water bottle holder per set of bosses. Accessories will directly attach to factory installed braze-on bosses allowing for more than one holder.

U.S. Pat. No. 4,809,890 to Tsigadas discloses a security box adapted to be mounted on a bicycle bar comprises a tubular container slidably mounted in a sleeve member. The container has a sliding cover at one end which locks by a tongue arrangement which engages the container per se. The container has a pin retractably projecting through its periphery and adapted to penetrate into a recess in the sleeve member. The pin can be retracted from the recess only from the inside of the container. The sleeve member which is fastened to the bicycle bar cannot be unfastened when the container is in the sleeve member.

U.S. Pat. No. 4,697,725 to Miree discloses apparatus for mounting flashlights to bicycles have concave surfaces for directly supporting flashlights and which are releasably held thereto by Velcro type material bearing straps. The apparatuses also have semi-cylindrical channels adapted to be placed in mating contact with bar elements of the bicycles and releasably held thereto by other Velcro type material bearing straps.

The present invention differs from the above described patented inventions as the present invention includes a fabric strap disposed through a slot in the mounting base and having a fabric strap first hook portion, a fabric strap first strap portion, a fabric strap second hook portion, a fabric strap second hook portion, a fabric strap second loop portion, a fabric strap second strap portion, a fabric strap buckle engagement portion, and a fabric strap buckle, functioning to releasably secure the mounting base to a bicycle; a fabric strap first hook portion disposed at the bottom left end of the fabric strap functioning to releasably engage a loop portion; a fabric strap first strap portion disposed at the top left end of the fabric strap functioning to support the fabric strap; a fabric strap second hook portion disposed adjacent the fabric strap first strap portion functioning to releasably engage a hook portion; a fabric strap second hook portion disposed adjacent the fabric strap first hook portion functioning to releasably engage a hook portion; a fabric strap second loop portion disposed adjacent the fabric strap second hook portion at the top right end of the fabric strap functioning to releasably engage a hook portion; a fabric strap second strap portion disposed adjacent the fabric strap first loop portion at the bottom right end of the fabric strap functioning to support the fabric strap; a fabric strap buckle engagement portion disposed adjacent the fabric strap second loop portion and a fabric strap second strap portion disposed adjacent the right end of the fabric strap functioning to secure the fabric strap buckle to the fabric strap; a fabric strap buckle secured to the fabric strap buckle engagement portion functioning to facilitate the securing of the fabric strap; a fabric strap buckle first end functioning to facilitate the securing of the fabric strap; and a fabric strap buckle second end functioning to facilitate the securing of the fabric strap; a mounting base defining a slot therethrough and having a mounting base first curved portion, a mounting base second curved surface, a mounting base left slot opening and a mounting base right slot opening, functioning to engage with a surface a bicycle and to support a bicycle accessory thereon.

Numerous innovations for bicycle accessory mounting apparatus have been provided in the prior art that are adapted to be used. Even though these innovations may be suitable for the specific individual purposes to which they address, they would not be suitable for the purposes of the present invention as heretofore described.

Accordingly, it is a general object of the present invention to overcome the above disadvantages by providing apparatus and methods for releasably securing accessories, such as locks and water bottles, to a bicycle.

It is a further object of the present invention to provide a bicycle accessory mounting apparatus that is easy to use. More particularly, it is an object of the present invention to provide a bicycle accessory mounting apparatus which can quickly attach an accessory to a bicycle.

It is a further object of the present invention to provide a quality device for holding one or more accessories easily, reliably, and with minimal mechanical skill.

It is a further object of the present invention to provide a versatile device which will compensate for different tubing sizes such as forks, stays, and seat posts, retrofit all conventional bicycles, easy maneuverability, non rusting, and non marring of the painted surfaces.

Other objects of the present invention will in part be obvious and will in part appear hereinafter.

SUMMARY OF THE INVENTION

Objects and advantages of the invention will be set forth in part in the description that follows and in part will be obvious from the description and figures, or may be learned by practice of the invention. Such objects and advantages may be realized and attained by the means of the instrumentalities and combinations particularly pointed out in the appended claims.

The present invention overcomes the problems and disadvantages of the prior art by providing an accessory mounting apparatus for releasably securing accessories having a generally tubular dimension of varying length and thickness to a bicycle or the like. Moreover, the apparatus is lightweight, safe, easy to use and remove, and is simple and cost effective to manufacture.

To achieve the objects in accordance with the purpose of the invention, as embodied and broadly described herein, there is provided a mounting apparatus for releasably securing an accessory to a bicycle, which includes a fabric strap having a fabric strap first hook portion, a fabric strap first strap portion, a fabric strap second hook portion, a fabric strap first loop portion, a fabric strap second loop portion, a fabric strap second strap portion, a fabric strap buckle engagement portion, and a fabric strap buckle; and a mounting base defining a slot receiving the fabric strap therethrough and having a mounting base first curved portion, a mounting base second curved surface, a mounting base left slot opening and a mounting base right slot opening. When the fabric strap and mounting base are designed in accordance with the present invention, the mounting apparatus can releasably secure a bicycle accessory safely and efficiently to a bicycle.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—mounting apparatus 10;
12—fabric strap 12;
12A—fabric strap first hook portion 12A;
12B—fabric strap first strap portion 12B;
12C—fabric strap second hook portion 12C;
12D—fabric strap first loop portion 12D;
12E—fabric strap second loop portion 12E;
12F—fabric strap second strap portion 12F;
12G—fabric strap buckle engagement portion 12G;
12H—fabric strap buckle 12H;
12HA—fabric strap buckle first end 12HA;
12HB—fabric strap buckle second end 12HB;
14—mounting base 14;
14A—mounting base first curved portion 14A;
14AA—mounting base first curved portion left side 14AA;
14AB—mounting base first curved portion right side 14AB;
14B—mounting base second curved surface 14B;
14BA—mounting base second curved surface left edge 14BA;
14BB—mounting base second curved surface right edge 14BB;
14C—mounting base left slot opening 14C;
14D—mounting base right slot opening 14D;
16—bicycle frame 16;
16A—bicycle frame cross bar 16A;
16B—bicycle frame diagonal bar 16B;
18—bicycle pump 18; and
20—water bottle 20.

DETAILED LIST OF REFERENCE NUMERALS UTILIZED IN THE DRAWING

10—mounting apparatus 10 comprising: a fabric strap 12 disposed through a mounting base 14, functioning to releasably mount a bicycle accessory to a bicycle;

12—fabric strap 12 disposed through a slot in the mounting base 14 and having a fabric strap first hook portion 12A, a fabric strap first strap portion 12B, a fabric strap second hook portion 12C, a fabric strap first loop portion 12D, a fabric strap second loop portion 12E, a fabric strap second strap portion 12F, a fabric strap buckle engagement portion 12G, and a fabric strap buckle 12H, functioning to releasably secure mounting base 14 to a bicycle;

12A—fabric strap first hook portion 12A disposed at the bottom left end of fabric strap 12 functioning to releasably engage a loop portion;

12B—fabric strap first strap portion 12B disposed at the top left end of fabric strap 12 functioning to support fabric strap 12;

12C—fabric strap second hook portion 12C disposed adjacent fabric strap first strap portion 12B functioning to releasably engage a loop portion;

12D—fabric strap first loop portion 12D disposed adjacent fabric strap first hook portion 12A functioning to releasably engage a hook portion;

12E—fabric strap second loop portion 12E disposed adjacent fabric strap second hook portion 12C at the top right end of fabric strap 12 functioning to releasably engage a hook portion;

12F—fabric strap second strap portion 12F disposed adjacent fabric strap first loop portion 12D at the bottom right end of fabric strap 12 support fabric strap 12;

12G—fabric strap buckle engagement portion 12G disposed adjacent fabric strap second loop portion 12E and fabric strap second strap portion 12F at the right end of fabric strap 12 functioning to secure fabric strap buckle 12H to fabric strap 12;

12H—fabric strap buckle 12H secured to fabric strap buckle engagement portion 12G functioning to facilitate the securing of fabric strap 12;

12HA—fabric strap buckle first end 12HA functioning to facilitate the securing of fabric strap 12;

12HB—fabric strap buckle second end 12HB functioning to facilitate the securing of fabric strap 12;

14—mounting base 14 defining a slot therethrough and having a mounting base first curved portion 14A, a mounting base second curved surface 14B, a mounting base left slot opening 14C and a mounting base right slot opening 14D, functioning to engage with a surface a bicycle and to support an accessory thereon;

14A—mounting base first curved portion 14A formed on a first end of mounting base 14 between a mounting base first curved portion left side 14AA and a mounting base first curved portion right side 14AB, functioning to engage a surface of a bicycle or support an accessory thereon;

14AA—mounting base first curved portion left side 14AA;

14AB—mounting base first curved portion right side 14AB;

14B—mounting base second curved surface 14B formed on a second end of mounting base 14 between a mounting base first curved portion left side 14BA and a mounting base first curved portion right side 14BB, functioning to engage a surface of a bicycle or support an accessory thereon;

14BA—mounting base second curved surface left edge 14BA;

14BB—mounting base second curved surface right edge 14BB;

14C—mounting base left slot opening 14C disposed on the left side of mounting base 14 and adapted to receive fabric strap 12 therethrough;

14D—mounting base right slot opening 14D disposed on the right side of mounting base 14 and adapted to receive fabric strap 12 therethrough;

16—bicycle frame 16 having a bicycle frame cross bar 16A and a bicycle frame diagonal bar 16B;

16A—bicycle frame cross bar 16A functioning to support bicycle frame 16;

16B—bicycle frame diagonal bar 16B functioning to support bicycle frame 16;

18—bicycle pump 18; and
20—water bottle 20.

BRIEF DESCRIPTION OF THE PREFERRED EMBODIMENT

FIG. 1 is a perspective view of a fabric strap in accordance with a preferred embodiment of the present invention;

FIG. 2 is a perspective view of a mounting base in accordance with a preferred embodiment of the present invention;

FIG. 3 is a perspective view of the mounting base of FIG. 2 illustrating a fabric strap disposed therethrough;

FIG. 4 is a partial perspective view of a bicycle with mounting apparatus of the present invention mounted thereon; and FIG. 5 is a partial elevational perspective view of the bicycle mounting base of the present invention illustrating the folding features of the fabric strap.

DETAILED DESCRIPTION OF THE PREFERRED EMBODIMENT

Referring now to the figures generally and to certain figures more specifically, there is shown and described a mounting apparatus according to the present invention.

Referring now to FIG. 1, there is shown a perspective view of a fabric strap in accordance with a preferred embodiment of the present invention exhibiting the following features: fabric strap 12 having a fabric strap first hook portion 12A, a fabric strap first strap portion 12B, a fabric strap second hook portion 12C, a fabric strap second loop portion 12E, a fabric strap second strap portion 12F, and a fabric strap buckle 12H, functioning to releasably secure mounting base 14 to a bicycle; fabric strap first hook portion 12A disposed at the bottom left end of fabric strap 12 functioning to releasably engage a loop portion; fabric strap first strap portion 12B disposed at the top left end of fabric strap 12 functioning to support fabric strap 12; fabric strap second hook portion 12C disposed adjacent fabric strap first strap portion 12B functioning to releasably engage a hook portion; fabric strap second loop portion 12E disposed adjacent fabric strap second hook portion 12C at the top right end of fabric strap 12 functioning to releasably engage a hook portion; fabric strap second strap portion 12F disposed adjacent fabric strap first loop portion 12D at the bottom right end of fabric strap 12 support fabric strap 12; fabric strap buckle 12H secured to fabric strap buckle engagement portion 12G functioning to facilitate the securing of fabric strap 12; fabric strap buckle first end 12HA functioning to facilitate the securing of fabric strap 12; and fabric strap buckle second end 12HB functioning to facilitate the securing of fabric strap 12.

Referring now more specifically to FIG. 2, there is shown a perspective view of a mounting base in accordance with a preferred embodiment of the present invention exhibiting the following features: mounting base 14 defining a slot therethrough and having a mounting base first curved portion 14A, a mounting base second curved surface 14B, a mounting base left slot opening 14C and a mounting base right slot opening 14D, functioning to engage with a surface a bicycle and to support a bicycle accessory thereon; mounting base first curved portion 14A formed on a first end of mounting base 14 between a mounting base first curved portion left side 14AA and a mounting base first curved portion right side 14AB, functioning to engage a surface of a bicycle or support a bicycle accessory thereon; mounting base first curved portion left side 14AA; mounting base first curved portion right side 14AB; mounting base second curved surface 14B formed on a second end of mounting base 14 between a mounting base first curved portion left side 14BA and a mounting base first curved portion right side 14BB, functioning to engage a surface of a bicycle or support a bicycle accessory thereon; mounting base second curved surface left edge 14BA; mounting base second curved surface right edge 14BB; mounting base left slot opening 14C disposed on the left side of mounting base 14 and adapted to receive fabric strap 12 therethrough; and mounting base right slot opening 14D disposed on the right side of mounting base 14 and adapted to receive fabric strap 12 therethrough. Mounting base 14 is advantageously constructed of a material which is soft so that it will not damage the finish of the bicycle, is sticky so that it is able to snugly secure accessories, and is flexible and strong so as to allow mounting base 14 to deform to accommodate a variety of shapes and sizes, yet withstand stress forces. It has been found advantageous to construct base 14 out of the polyelastomer having a PVC base. In the preferred embodiment, body portions 30 is constructed from KRATON® manufactured by Shell Oil Company. KRATON® grade G2705 has a tensile modulus of 400 p.s.i. at 300% elongation and a shore-A-hardness of 55. In general, materials having a shore-A-hardness of 40–85 are suitable for a wide variety of mounting applications.

Referring now more specifically to FIG. 3, there is shown a perspective view of the mounting base of FIG. 2 illustrating a fabric strap disposed therethrough exhibiting the following features: fabric strap 12 disposed through a slot in the mounting base 14 and having a fabric strap first hook portion 12A, a fabric strap first strap portion 12B, a fabric strap second hook portion 12C, a fabric strap first loop 12D, a fabric strap second loop portion 12E, a fabric strap second strap portion 12F, a fabric strap buckle engagement portion 12G, and a fabric strap buckle 12H, functioning to releasably secure mounting base 14 to a bicycle; fabric strap first hook portion 12A disposed at the bottom left end of fabric strap 12 functioning to releasably engage a loop portion; fabric strap first strap portion 12B disposed at the top left end of fabric strap 12 functioning to support fabric strap 12; fabric strap second hook portion 12C disposed adjacent fabric strap first strap portion 12B functioning to releasably engage a hook portion; fabric strap first loop portion 12D disposed adjacent fabric strap first hook portion 12A functioning to releasably engage a hook portion; fabric strap second loop portion 12E disposed adjacent fabric strap second hook portion 12C at the top right end of fabric strap 12 functioning to releasably engage a hook portion; fabric strap second strap portion 12F disposed adjacent fabric strap first loop portion 12D at the bottom right end of fabric strap 12 support fabric strap 12; fabric strap buckle engagement portion 12G disposed adjacent fabric strap second loop portion 12E and fabric strap second strap portion 12F at the right end of fabric strap 12 functioning to secure fabric strap buckle 12H to fabric strap 12; fabric strap buckle 12H secured to fabric strap buckle engagement portion 12G functioning to facilitate the securing of fabric strap 12; fabric strap buckle first end 12HA functioning to facilitate the securing of fabric strap 12; and fabric strap buckle second end 12HB functioning to facilitate the securing of fabric strap 12; mounting base 14 defining a slot therethrough and having a mounting base first curved portion 14A, a mounting base second curved surface 14B, a mounting base left slot opening 14C and a mounting base right slot opening 14D, functioning to engage with a surface a bicycle and to support a bicycle accessory thereon; mounting base first curved portion 14A formed on a first end of mounting base 14 between a mounting base first curved portion left side 14AA and a mounting base first curved portion right side 14AB, functioning to engage a surface of a bicycle or support a bicycle accessory thereon; mounting base first curved portion left side 14AA; mounting base first curved portion right side 14AB; mounting base second curved surface 14B formed on a second end of mounting base 14 between a mounting base first curved portion left side 14BA and a mounting base first curved portion right side 14BB, functioning to engage a surface of a bicycle or support a bicycle accessory thereon; mounting base second curved surface left edge 14BA; mounting base second curved surface right edge 14BB; mounting base left slot opening 14C disposed on the left side of mounting base 14 and adapted to receive fabric strap 12 therethrough; and mounting base right slot opening 14D disposed on the right side of mounting base 14 and adapted to receive fabric strap 12 therethrough.

Referring now more specifically to FIG. 4, there is shown a partial perspective view of a bicycle with mounting apparatus 10 of the present invention mounted thereon exhibiting the following features: a pair of bicycle mounting bases 10 respectively securing a bicycle pump 18 to bicycle frame cross bar 16A and a water bottle 20 to bicycle frame diagonal bar 16B.

Referring now more specifically to FIG. 5, there is shown a partial elevational perspective view of the mounting apparatus of the present invention illustrating the folding of the fabric strap and further exhibiting the following features: fabric strap 12 disposed through a slot in the mounting base 14 and having a fabric strap first hook portion 12A, a fabric strap first strap portion 12B, a fabric strap second hook portion 12C, a fabric strap first loop portion 12D, a fabric strap second loop portion 12E, a fabric strap second strap portion 12F, a fabric strap buckle engagement portion 12G, and a fabric strap buckle 12H, functioning to releasably secure mounting base 14 to a bicycle; fabric strap first hook portion 12A disposed at the bottom left end of fabric strap 12 functioning to releasably engage a loop portion; fabric strap first strap portion 12B disposed at the top left end of fabric strap 12 functioning to support fabric strap 12; fabric strap second hook portion 12C disposed adjacent fabric strap first strap portion 12B functioning to releasably engage a hook portion; fabric strap first loop portion 12D disposed adjacent fabric strap first hook portion 12A functioning to releasably engage a hook portion; fabric strap second loop portion 12E disposed adjacent fabric strap second hook portion 12C at the top right end of fabric strap 12 functioning to releasably engage a hook portion; fabric strap second strap portion 12F disposed adjacent fabric strap first loop portion 12D at the bottom right end of fabric strap 12 support fabric strap 12; fabric strap buckle engagement portion 12G disposed adjacent fabric strap second loop portion 12E and fabric strap second strap portion 12F at the right end of fabric strap 12 functioning to secure fabric strap buckle 12H to fabric strap 12; fabric strap buckle 12H secured to fabric strap buckle engagement portion 12G functioning to facilitate the securing of fabric strap 12; fabric strap buckle first end 12HA functioning to facilitate the securing of fabric strap 12; and fabric strap buckle second end 12HB functioning to facilitate the securing of fabric strap 12; mounting base 14 defining a slot therethrough and having a mounting base first curved portion 14A, a mounting base second curved surface 14B, a mounting base left slot opening 14C and a mounting base right slot opening 14D, functioning to engage with a surface a bicycle and to support a bicycle accessory thereon; mounting base first curved portion 14A formed on a first end of mounting base 14 between a mounting base first curved portion left side 14AA and a mounting base first curved portion right side 14AB, functioning to engage a surface of a bicycle or support a bicycle accessory thereon; mounting base first curved portion left side 14AA; mounting base first curved portion right side 14AB; mounting base second curved surface 14B formed on a second end of mounting base 14 between a mounting base first curved portion left side 14BA and a mounting base first curved portion right side 14BB, functioning to engage a surface of a bicycle or support an bicycle accessory thereon; mounting base second curved surface left edge 14BA; mounting base second curved surface right edge 14BB; mounting base left slot opening 14C disposed on the left side of mounting base 14 and adapted to receive fabric strap 12 therethrough; and mounting base right slot opening 14D disposed on the right side of mounting base 14 and adapted to receive fabric strap 12 therethrough.

With reference to FIG. 5 in conjunction with FIG. 3, the use of bicycle mounting base 10 will now be described for mounting a bicycle pump to a bicycle cross bar. With bicycle mounting base 10 in the position shown in FIG. 3, mounting base first curved surface 14A is placed into contact with bicycle frame cross bar 16A and bicycle pump 1 is placed into contact with mounting base second curved surface 14B as shown in FIG. 5. Fabric strap first hook portion 12A is then threaded through fabric strap buckle 12H forming a first loop encircling bicycle frame cross bar 16A. Fabric strap first hook portion 12A is then pulled back over itself and bicycle frame cross bar 16A, and inserted through fabric strap buckle 12H a second time forming a second loop encircling bicycle pump 18. Fabric strap first hook portion 12A is then pulled tight and engaged with fabric strap first loop portion 12D to secure bicycle pump 18 firmly to bicycle frame cross bar 16A as shown in FIG. 5. In addition, due to the manner in which fabric strap 12 is folded onto itself, other portions of fabric strap 12 are engaged with one another to further secure bicycle pump 18 to bicycle frame cross bar 16A as shown in detail in FIG. 5.

It will be understood that each of the elements described above, or two or more together, may also find a useful application in other types of constructions differing from the type described above.

While the invention has been illustrated and described as embodied in a bicycle mounting base, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A mounting apparatus for releasably securing an accessory to a support, comprising:
    a fabric strap having a fabric strap first hook portion, a fabric strap second hook portion, a fabric strap first loop portion, a fabric strap second loop portion, a fabric strap buckle engagement portion, and a fabric strap buckle; and
    a mounting having a first end and a second end base defining a slot receiving the fabric strap therethrough and having a mounting base first curved portion at said first end, a mounting base second curved surface at said second end, a mounting base left slot opening and a mounting base right slot opening whereby said fabric strap is adapted to cinch the support and accessory.

2. The mounting apparatus according to claim 1, wherein the mounting base first curved portion is formed on a first end of the mounting base between a mounting base first curved portion left side and a mounting base first curved portion right side.

3. The mounting apparatus according to claim 2, wherein the mounting base second curved surface is formed on a second end of the mounting base between a mounting base first curved surface left side and a mounting base first curved surface right side.

4. The mounting apparatus according to claim 3, wherein the left slot opening is adapted to receive the fabric strap there through, and the right slot opening is adapted to receive the fabric strap there through.

5. The mounting apparatus according to claim 4, said fabric strap having a left end, a right end, a top and a bottom, wherein the fabric strap first hook portion is disposed at the bottom left end of the fabric strap and functions to releasably engage the fabric strap first loop portion.

6. The mounting apparatus according to claim 5, the fabric strap further including a fabric strap first portion and a fabric strap second portion, wherein the fabric strap first strap portion is disposed at the top left end of the fabric strap and functions to support the fabric strap.

7. The mounting apparatus according to claim 6, wherein the fabric strap second hook portion is disposed adjacent the fabric strap first strap portion and functions to releasably engage the fabric strap second hook portion.

8. The mounting apparatus according to claim 7, wherein the fabric strap first loop portion is disposed adjacent the fabric strap first hook portion and functions to releasably engage the fabric strap first hook portion.

9. The mounting apparatus according to claim 8, wherein the fabric strap second loop portion is disposed adjacent the fabric strap second hook portion at the top right end of the fabric strap and functions to releasably engage the fabric strap second hook portion.

10. The mounting apparatus according to claim 9, wherein the fabric strap second strap portion is disposed adjacent the fabric strap first loop portion at the bottom right end of the fabric strap and functions to support the fabric strap.

11. The mounting apparatus according to claim 10, wherein the fabric strap buckle engagement portion is disposed adjacent the fabric strap second loop portion and the fabric strap second strap portion at the right end of the fabric strap, and functions to secure the fabric strap buckle to the fabric strap.

12. The mounting apparatus according to claim 11, wherein the fabric strap buckle is secured to the fabric strap buckle engagement portion and functions to facilitate the securing of the fabric strap.

13. A mounting apparatus according to claim 4, wherein the mounting base is flexible so as to allow the mounting base to deform.

14. A mounting apparatus according to claim 13, wherein the mounting base is constructed of material having a shore-A-hardness of 40–85.

15. The mounting apparatus according to claim 1, wherein the mounting base first curved portion has an arcuate surface adapted to engage a surface of a support or accessory.

16. The mounting apparatus according to claim 15, wherein the mounting base second curved surface has an arcuate surface adapted to engage a surface of a support or accessory.

17. A method of releasably securing an accessory to a bar member, comprising the steps of:

provyding a mounting base having: a fabric strap first hook portion, a fabric strap first strap portion, a fabric strap second hook portion, a fabric strap first loop portion, a fabric strap second loop portion, a fabric strap second strap portion, a fabric strap buckle engagement portion, and a fabric strap buckle, a mounting base defining a slot receiving the fabric strap there through and having a mounting base first curved portion, a mounting base second curved surface, a mounting base left slot opening and a mounting base right slot opening;

placing the mounting base first curved portion into contact with the bar member;

placing the mounting base second curved surface into contact with the accessory;

placing at least the fabric strap first hook portion through the fabric strap buckle to form a first loop encircling the bar member therein;

placing at least the fabric strap first hook portion through the fabric strap buckle a second time to form a second loop encircling the accessory therein; and engaging at least the fabric strap first hook portion with the fabric strap first loop portion securing the accessory to the bar member.

18. The method as described in claim 17, further comprising the step of selecting a water bottle as the accessory.

19. The method as described in claim 17, further comprising the step of selecting a bicycle pump as the accessory.

20. The method as described in claim 17, further comprising the step of selecting a bicycle cross bar as the bar member.

* * * * *